United States Patent
Ohkubo et al.

(10) Patent No.: US 8,696,949 B2
(45) Date of Patent: Apr. 15, 2014

(54) PARTICULATE MIXTURE, ACTIVE MATERIAL AGGREGATE, CATHODE ACTIVE MATERIAL, CATHODE, SECONDARY BATTERY AND METHODS FOR PRODUCING THE SAME

(75) Inventors: Michio Ohkubo, Tokyo (JP); Takeshi Yagi, Tokyo (JP); Michihiro Shimada, Tokyo (JP); Naoki Uno, Tokyo (JP); Yosuke Hirayama, Tokyo (JP); Takeshi Nishimura, Tokyo (JP); Toshio Tani, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 49 days.

(21) Appl. No.: 13/596,609

(22) Filed: Aug. 28, 2012

(65) Prior Publication Data
US 2013/0052529 A1 Feb. 28, 2013

Related U.S. Application Data

(63) Continuation of application No. PCT/JP2011/054351, filed on Feb. 25, 2011.

(30) Foreign Application Priority Data

Mar. 1, 2010 (JP) ................................. 2010-044202

(51) Int. Cl.
*H01B 1/18* (2006.01)
(52) U.S. Cl.
USPC .............. 252/521.3; 252/518.1; 252/519.51; 252/520.21; 252/520.4; 252/521.2; 429/211; 429/231.1; 429/252

(58) Field of Classification Search
USPC ............ 429/211, 231.1, 252, 579; 252/521.3, 252/519.51, 520.21, 520.4, 521.2, 518.1
See application file for complete search history.

(56) References Cited

U.S. PATENT DOCUMENTS

| | | | |
|---|---|---|---|
| 2003/0053945 A1* | 3/2003 | Fukuoka et al. | 423/332 |
| 2007/0224508 A1* | 9/2007 | Aramata et al. | 429/231.95 |
| 2008/0241693 A1* | 10/2008 | Fukuchi et al. | 429/231.1 |

FOREIGN PATENT DOCUMENTS

| | | |
|---|---|---|
| JP | 2001266882 A | 9/2001 |
| JP | 2007335325 A | 12/2007 |

(Continued)

OTHER PUBLICATIONS

Miki Yasutomi et al. "Synthesis and Electrochecmical Properties of Li2-xM(SiO4)1-x(PO4)x(M = Fe, Mn) Positive Active Materials by Hydrothermal Process for Li-ion Cells" GS Yuasa Technical Report, GS Yuasa Corporation, Jun. 26, 2006, vol. 6, No. 1, pp. 21-26.

(Continued)

Primary Examiner — Harold Pyon
Assistant Examiner — Katie L Hammer
(74) Attorney, Agent, or Firm — Lowe Hauptman & Ham, LLP

(57) ABSTRACT

A particulate mixture which can be used as a precursor of lithium transition metal silicate-type compound of small particle size and low crystallinity, is provided. It is a mixture of silicon oxide particulates, transition metal oxide particulates, and lithium transition metal silicate particulates, and its powder X-ray diffraction measurement shows diffraction peaks near $2\theta=33.1°$ and near $2\theta=35.7°$, and said silicon oxide particulates and said transition metal oxide particulates are amorphous, and said lithium transition metal silicate particulates are in a microcrystalline or amorphous state.

4 Claims, 6 Drawing Sheets

(56) References Cited

FOREIGN PATENT DOCUMENTS

| JP | 2009104794 A | 5/2009 |
| JP | 2011076793 A | 4/2011 |
| WO | 2008107571 A2 | 9/2008 |
| WO | 2010089931 A1 | 8/2010 |

OTHER PUBLICATIONS

International Search Report for PCT/JP2011/054351 mailed May 17, 2011.

* cited by examiner

PARTICULATE MIXTURE, ACTIVE MATERIAL AGGREGATE, CATHODE ACTIVE MATERIAL, CATHODE, SECONDARY BATTERY AND METHODS FOR PRODUCING THE SAME

RELATED APPLICATIONS

The present application is a continuation of PCT/JP2011/054351, filed Feb. 25, 2011 and is based on, and claims priority from, Japanese Application Number 2010-044202, filed Mar. 1, 2010.

TECHNICAL FIELD

The present invention relates to a particulate mixture etc., which comprises amorphous or low crystallinity lithium transition metal silicate, which is used as a precursor of active material for cathodes in non-aqueous electrolyte secondary batteries.

BACKGROUND ART

In recent years, with the mobilization and high functionality of electronic equipments, the secondary battery, which is a power source, has become one of the most important parts. In particular, Li-ion secondary battery has become the mainstream in place of conventional NiCd battery and Ni—H battery, due to its high energy density obtained from the high voltage of the cathode active material and anode active material. However, Li-ion secondary battery by the combination of lithium cobalt oxide ($LiCoO_2$)-type cathode active material and carbon-type anode active material mainly composed of graphite, which is normally used as Li-ion battery presently, is incapable of sufficiently supplying the amount of electricity required for today's high-functionality and high-load electronic parts, and is not able to fulfill the required performance as a portable power source.

The theoretical electrochemical specific capacity of the cathode active material is generally small, and manganic acid-type lithium and nickel oxide-type lithium currently used beside cobalt oxide-type lithium, as well as iron phosphate-type lithium that is being studied to be put in practical use, all remain to show smaller values than the theoretical specific capacity of current carbon-type anode active materials. However, the carbon-type anode active material, of which its performance has been rising little by little every year, is also approaching the theoretical specific capacity, and it is becoming impossible to anticipate large improvement in power source capacity with the current combination of cathode and anode active material systems. There appears to be a limitation in meeting requirements for high-functionality and long term mobile running of electronic devices, for loading on to industrial applications such as electric power tools, uninterruptible power sources, and electric storage devices, for which adoption is spreading, and for electric-powered vehicles.

Under such circumstances, metal-type anode active materials are being examined for application, as a method to dramatically increase the electric capacity than that currently possible, in place of the carbon (C)-type anode active material. Such method enables several to ten times the theoretical specific capacity of the current carbon-type anode. These active materials are germanium (Ge), tin (Sn) or silicon (Si)-type materials. In particular, Si has a specific capacity that is comparable to that of metallic Li, which is said to be difficult to put to practical use, and is thus, being the center of study.

However, in the present situation, because the specific capacity of the cathode active material side is low, the large theoretical specific capacity of Si is actually not being put to use in batteries. The per-unit-mass theoretical specific capacity of the layered or tunnel-like compound complex oxides, which can serve as an intercalation host of Li that is being considered for utilization as a cathode active material, is slightly over 150 mAh/g at most, which is less than half the specific capacity of the present carbon-type anode active material, and is actually ½₀ or less against the theoretical specific capacity of Si. For this reason, the examination of substance systems in aim to achieve higher capacity of cathode active material is also needed. As a candidate for new cathode active material, studies on lithium transition metal silicate-type compound, which is expected to exceed 300 mAh/g, or twice the conventional value, depending on its components, are beginning (for example, Patent Document 1 and Non-patent Document 1).

PRIOR ART DOCUMENTS

Patent Documents

[Patent Document 1] JP-A-2001-266882

Non-patent Documents

[Nonpatent Document 1] Miki Yasutomi et al., "Synthesis and Electrochemical Properties of $Li_{2-x}M(SiO_4)_{1-x}(PO_4)_x$ (M=Fe, Mn) Positive Active Materials by Hydrothermal Process for Li-ion Cells", GS Yuasa Technical Report, GS Yuasa Corporation, Jun. 26, 2009, Vol. 6, No. 1, pp. 21-26

SUMMARY OF THE INVENTION

Technical Problem

However, in conventional studies of lithium transition metal silicate-type compounds, rather than obtaining high electrochemical specific capacity, cell charge-and-discharge reaction did not occur in normally-used room temperature environment, and was only accomplished under a raised temperature environment, as described in Non-patent Document 1.

The present inventors earnestly compared and examined conventionally-used cathode active materials and conventional lithium transition metal silicate-type compounds, and discovered that conventional lithium transition metal silicate-type compounds had high crystallinity and that the size of the crystals were large; thus, it was found that they are disadvantageous as intercalation hosts of Li ions, even if the lithium transition metal silicate-type compounds were made to coexist with electrical conducting materials to add conductivity, or supported or coated with conductive substances.

Means for Solving the Problem

The present invention was made in view of the aforementioned problems, and its object is to provide a particulate mixture etc., which can be used as a precursor of a lithium transition metal silicate-type compound of small particle size and low crystallinity. Further, another object of the present invention is to provide a cathode active material, which contains a lithium transition metal silicate-type compound, and is able to conduct charge-and-discharge reaction under room temperature environment.

Hence, the present invention provides the following inventions.

(1) A particulate mixture, which comprises silicon oxide particulates, transition metal oxide particulates, and lithium transition metal silicate particulates; wherein its powder X-ray diffraction measurement shows diffraction peaks near $2\theta=33.1°$ and near $2\theta=35.7°$; said silicon oxide particulates and said transition metal oxide particulates are amorphous; and said lithium transition metal silicate particulates are in a microcrystalline or amorphous state.

(2) The particulate mixture according to (1), wherein the half width of the diffraction peak near $2\theta=33.1°$ is 0.35° or more, and the half width of the diffraction peak near $2\theta=35.7°$ is 0.35° or more.

(3) The particulate mixture according to (1), wherein said transition metal oxide particulates and said lithium transition metal silicate particulates contain at least two elements selected from Fe, Mn, Ti, Cr, V, Ni, Co, Cu, Zn, Al, Ge, Zr, Mo, or W.

(4) The particulate mixture according to (1), wherein part of the silicate in said lithium transition metal silicate particulates are replaced by metallate, phosphate, or borate, which does not emit oxygen.

(5) An active material aggregate obtained by heating the particulate mixture of (1), wherein said active material aggregate is porous, and the size of voids observable from the surface of said active material aggregate is 0.01-0.6 μm.

(6) A cathode active material obtained by grinding an active material aggregate obtained by heat-treating the particulate mixture of (1), wherein its powder X-ray diffraction measurement shows diffraction peaks near $2\theta=33.1°$ and near $2\theta=35.7°$, and a diffraction peak in at least one range selected from $2\theta=18-20°$, $2\theta=26-28°$, $2\theta=30-32°$, $2\theta=38-40°$ or $2\theta=42-44°$.

(7) The cathode active material according to (6), wherein particle size distribution by observation measurement of transmission electron microscope image is within 5-150 nm and average particle size is within 10-70 nm.

(8) The cathode active material according to (6), wherein at least part of said material is carbon coated or carbon is supported on at least part of the surface of said material.

(9) The cathode active material according to (6), which is in a microcrystalline state, in which fine crystals and amorphous components coexist.

(10) A cathode for non-aqueous electrolyte secondary battery, which comprises a current collector, and a cathode active material layer, which comprises the cathode active material of (6), on at least one side of said current collector.

(11) A non-aqueous electrolyte secondary battery, which utilizes the cathode for non-aqueous electrolyte secondary battery of (10).

(12) A method for producing a particulate mixture, which comprises: supplying a lithium source, a transition metal source, and a silicon source into a flame in a reaction vessel, and synthesizing a particulate mixture.

(13) The method for producing a particulate mixture according to (12), wherein said flame is an oxyhydrogen flame and the inside of said reaction vessel is under inert gas-filled atmosphere.

(14) The method for producing a particulate mixture according to (12), wherein said flame is a hydrocarbon flame containing oxygen, and the inside of said reaction vessel is under inert gas-filled atmosphere.

(15) The method for producing a particulate mixture according to (12), wherein said lithium source, said transition metal source, and said silicon source are chlorides, and raw materials of said flame contain at least hydrogen gas and oxygen gas.

(16) The method for producing a particulate mixture according to (12), wherein said lithium source, said transition metal source, and said silicon source are supplied to said flame as gases, or supplied after passing through a carburetor as liquids or solutions.

(17) A method for producing an active material aggregate, which comprises heat-treating a particulate mixture produced by the method for producing a particulate mixture of (12) at 300-900° C. for 0.5 to 10 hours.

(18) The method for producing an active material aggregate according to (17), wherein said heat-treating is performed by adding a carbon source.

(19) A method for producing a cathode active material, which comprises grinding the active material aggregate produced by the method for producing an active material aggregate of (17).

Effect of the Invention

The present invention is able to provide a particulate mixture that can be used as a precursor of lithium transition metal silicate-type compound with small particle size and low crystallinity. Further, the present invention can provide a cathode active material, which includes a lithium transition metal silicate-type compound, and is able to perform charge-and-discharge reaction at room temperature.

Furthermore, by using the particulate mixture of the present invention as a precursor, and controlling the condition of the successive cathode active material synthesis process, an optimal crystal form that corresponds to the intended secondary battery and opposite anode can be acquired. Further, by using such crystalline cathode active material, the Li ion diffusivity and electron conductivity of the active material particle itself is improved. As a result, deintercalation and intercalation of Li ion is elicited easily and a lithium transition metal silicate-type compound that is chargeable and dischargeable under normal room temperature environment can be obtained. The present invention serves as a foundation for the future realization of high charge-and-discharge capacity that the lithium transition metal silicate-type compound inherently has.

Further, since the cathode active material of the present invention has a large diffraction peak half width for X-ray diffraction measurement compared to those of conventional material, and the crystalline size is small, or the particle size is small, the electric conduction path of Li ion or electron in the single crystal or polycrystal particle is short; thus, ion conductivity and electron conductivity are excellent, and the barrier for charge-and-discharge reaction can be reduced. Furthermore, by coating or supporting an electric conduction assistant or conductive carbon, electrical conductivity and macroscopic current collectivity by an electric conduction path network to the current collector can be improved, and a lithium transition metal silicate-type compound, which can carry out charge and discharge even at low-temperature environments such as normally-used room temperature, can be provided.

Furthermore, the cathode active material of the present invention is in a microcrystalline state, which comprises crystals partly surrounded by amorphous contents, as compared with conventional cathode active materials. Such cathode active materials cannot be obtained by solid phase synthesis that has generally been used conventionally, but are obtained by supplying raw materials that serves as material source for the cathode active material to the same reaction-type, and reacting in a flame, to thereby produce a mainly amorphous particulate mixture, and subjecting to heat-treatment. According to such production method, a porous active material aggregate can easily be obtained; thus, by grinding this finely, an even cathode active material of small particle size and an approximate-sphere shape can be obtained. Hence, it is also possible to granulate into a secondary particle of a size that is easy to coat on a current collector, and a cathode active material layer that has high adhesiveness on current collector, wherein current collector content is diffused, can be obtained. When the lithium transition metal silicate-type compound component in the cathode active material of the present invention contains a plurality of transition metals that enable a 2 electron reaction in a charge-and-discharge reaction, a higher capacity can be further be obtained. Moreover, since it is a silicate-type compound that does not emit oxygen, ignition combustion does not occur even in high-temperature environments, and thus, can provide a safe secondary battery.

BEST MODE FOR CARRYING OUT THE INVENTION

Figure 1:
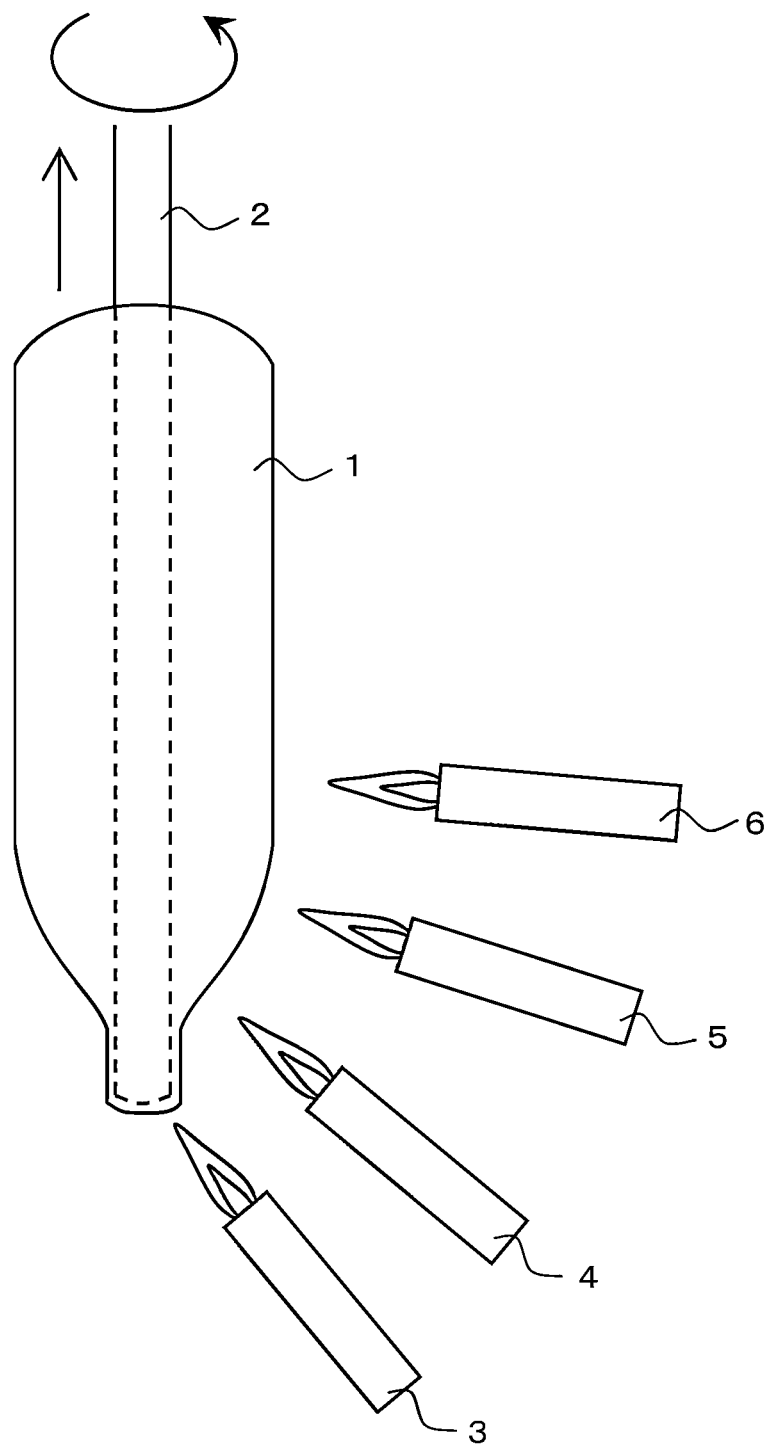
FIG. 1: a figure showing the reaction vessel of the flame method device for synthesizing the particulate mixture of the present invention.

Hereinafter, desirable embodiments for the particulate mixture and the cathode active material of the present invention will be described. However, the present invention is not limited to these embodiments.

The particulate mixture and the cathode active material of the present invention are provided as a powdery material. Furthermore, the cathode active material can be provided as slurry of the cathode active material itself or a secondary particle obtained by pelletizing the cathode active material to enlarge its particle size, in an aqueous solvent or an organic solvent, with a given amount of dispersant, thickener or conductive material added thereto. Further, it may also be provided as a cathode electrode form, obtained by applying such slurry to create a cathode active material coat on a current collector substrate. Moreover, the secondary battery of the present invention utilizes the cathode for secondary battery of the present invention, and is provided by assembling, with other known components such as an anode, a separator, and an electrolyte solution, to form a secondary battery.

The cathode active material of the present invention is prepared by calcining the particulate mixture, which is an active material precursor. The particulate mixture of the present invention comprises particulates of silicon oxide (silica), particulates of transition metal oxide, and particulates of lithium transition metal silicate. The silicon oxide in the particulate mixture of the present invention is amorphous, and the transition metal oxide also exists mostly in amorphous form; microcrystalline oxides merely exist in parts, such that the diffraction peak of some oxides is detected by X-ray diffraction. Furthermore, the lithium transition metal silicate particulates in the particulate mixture of the present invention is partially crystallized and mostly exist as microcrystalline with at least two diffraction peaks detected by X-ray. Note that in the present invention, microcrystallite or microcrystalline refers to general fine crystal forms, as well as the form in which a single crystal or a polycrystal particulate is surrounded by amorphous components.

(Method for Producing the Particulate Mixture)

The particulate mixture is synthesized by supplying the composition materials into the same reaction system. Among various methods of synthesis by supplying composition materials into the same reaction system to obtain the particulate mixture, flame methods such as flame hydrolysis method and thermal oxidation method are especially used. A flame method is a method of supplying composition materials into a flame by supplying gaseous material such as chlorides or by supplying liquid material through a vaporizer into a flame, thereby reacting the composition materials to obtain the desired substance. As a flame method, VAD (Vapor-phase Axial Deposition) method etc. may be listed as a suitable example.

Furthermore, the flame hydrolysis method is a method by which composition materials are hydrolyzed in a flame. In a flame hydrolysis method, an oxyhydrogen flame is generally used as a flame. The composition materials of the cathode active material are supplied to the flame, to which hydrogen gas and oxygen gas are supplied, or composition materials and flame materials (oxygen gas and hydrogen gas) are simultaneously supplied from a nozzle, to thereby synthesize the desired substance. In the flame hydrolysis method, a minute nano-scale particulate of the desired substance that is mainly amorphous can be obtained in an inert gas atmosphere.

Further, the thermal oxidation method is a method by which the composition materials undergo thermal oxidation in a flame. In the thermal oxidation method, a hydrocarbon flame is generally used, and the desired substance is synthesized by supplying gases of the composition materials to the flame, to which hydrocarbon gas (such as propane gas) and oxygen gas are supplied, or by simultaneously supplying gases of the composition materials and the flame materials (such as propane gas and oxygen gas) from a nozzle.

The composition materials for obtaining the particulate mixture of the present invention are a lithium source, a transition metal source, and a silicon source. For example, gas, liquid and solutions such as lithium chloride as a lithium source, transition metal chloride as a transition metal source, and silicon tetrachloride as a silicon source, may be utilized. When the materials are solids, they are dissolved in a solvent to create a solution and supplied to a flame through a vaporizer. When the materials are solutions, besides passing through a vaporizer, prior to the supply nozzle, it may be vaporized and supplied by heating, decompressing, or bubbling, in order to increase its vapor pressure.

As a lithium source, inorganic acid salts of lithium such as lithium chloride, lithium hydroxide, lithium carbonate, lithium nitrate, lithium bromide, lithium phosphate, and lithium sulfate, organic acids of lithium such as lithium oxalate, lithium acetate, and lithium naphthenate, lithium alkoxides such as lithium ethoxide, organic lithium compounds such as β-diketonato compound of lithium, lithium oxide, and lithium peroxide, etc. can be used. Note that naphthenic acid is a mixture of different carboxylic acids, in which two or more acidic substances in petroleum are mixed, and its main components are carboxylic compounds of cyclopentane and cyclohexane.

As a transition metal source, chlorides of various transition metals such as ferric chloride, manganese chloride, titanium tetrachloride, and vanadium chloride, oxalates of transition metals such as iron oxalate and manganese oxalate, transition metal acetates such as manganese acetate, etc., sulfates of transition metals such as ferrous sulfate and manganese sulfate, nitrates of transition metals such as manganese nitrate, hydroxides of transition metals, such as manganese oxyhydroxide and nickel hydroxide, ethylhexanoates of transition metals such as ferric 2-ethylhexanoate and manganous 2-ethylhexanoate, tetra-(2-ethylhexyl)titanate, naphthenates of transition metals such as iron naphthenate, manganese naphthenate, chromium naphthenate, zinc naphthenate, zirconium naphthenate, and cobalt naphthenate, transition metal hexoates such as manganese hexoate, cyclopentadienyl compounds of transition metals, transition metal alkoxides such as titanium tetraisopropoxide (TTIP) and titanium alkoxide, etc. may be utilized. Moreover, organometallic salts of transition metals of stearic acid, dimethyldithiocarbamic acid, acetylacetonate, oleic acid, linoleic acid, and linolenic acid etc., and oxides of various transition metals such as iron oxide and manganese oxide, may be utilized depending on conditions.

As described later, to use two or more types of transition metals for the lithium transition metal silicate compound, two or more types of transition metal materials are supplied into the flame.

As a silicon source, silicon tetrachloride, octamethylcyclotetrasiloxane (OMCTS), silicon dioxide, silicon monoxide, or hydrates of such silicon oxides, condensed silicates such as orthosilicate, metasilicate, and meta-2 silicate, tetraethyl orthosilicate (tetraethoxy-silane, TEOS), tetramethyl orthosilicate (tetramethoxysilane, TMOS), methyl trimethoxysilane (MTMS), methyl triethoxysilane (MTES), hexamethyl disiloxane (HMDSO), tetramethyl disiloxane (TMDSO), tetramethyl cyclotetrasiloxane (TMCTS), octamethyl cyclotetrasiloxane (OMCTS), octamethyl trisiloxane (OMTSO), and tetra-n-butoxysilane, etc. can be utilized.

Furthermore, when part of the silicate in the lithium transition metal silicate compound is substituted by another anion, transition metal oxides, materials of phosphoric acid, and materials of boric acid are added as an anion source. For example, titanium oxide, titanites such as iron titanite and manganese titanite, titanates such as zinc titanate, magnesium titanate and barium titanate, vanadium oxide, ammonium metavanadate, chromium oxide, chromates and dichromates, manganese oxide, permanganates and manganates, cobaltates, zirconium oxide, zirconates, molybdenum oxides, molybdates, tungsten oxide, tungstates, phosphates such as orthophosphate and metaphosphate, pyrophoric acid, ammonium hydrogen phosphates such as diammonium hydrogen phosphate and ammonium di-hydrogen phosphate, various phosphates and pyrophosphates such as ammonium phosphate and sodium phosphate, as well as phosphates with transition metals introduced such as ferrous phosphate, various borates such as boric acid, boron trioxide, sodium metaborate, sodium tetraborate, and borax can be used along with the respective desired anion source according to synthesis conditions.

These materials are supplied to the same reaction system along with flame materials to synthesize the particulate mixture. The generated particulate mixture can be collected by a filter from the exhaust. Further, as stated below, it may be produced on the perimeter of a wick stick. By installing a wick stick (also known as a core stick) of silica or a silicon-type material into a reaction vessel, supplying a lithium source, a transition metal source, and a silicon source in an oxyhydrogen flame or a propane flame including an oxygen source such as air, to thereby perform hydrolysis or oxidization, particulates of nano-order are generated and collected on the surface of the wick stick. These generated particulates are collected and filtered or sieved as necessary to remove impurities and large condensations. The particulate mixture thus obtained has a very minute particle diameter of nano-scale, and mainly consists of amorphous particulates.

In the flame method, which is the method of producing the particulate mixture of the present invention, the particulate mixture produced is amorphous and the size of the particle is small. Further, in a flame method, large quantity synthesis in a short period of time, as compared with conventional hydrothermal synthesis method and solid phase synthesis method, is made possible, and a homogeneous particulate mixture can be obtained at low cost.

(Features of the Particulate Mixture)

Although the particulate mixture mainly consists of oxides of lithium, transition metal and silicon oxide, and of amorphous particulates of lithium transition metal silicate, it is often produced containing crystalline oxides of transition metal. Further, crystal compositions of lithium transition metal silicate-type compounds are also partly contained. By measuring the powder X-ray diffraction of the particulate mixture in the range of $2\theta=10\text{-}50°$, diffraction peaks are obtained at least near $2\theta=33.1°$ and near $2\theta=35.7°$. Often, the diffraction peaks show a small and wide diffraction angle, which indicate a diffraction originating from the surface of each lithium transition metal silicate-type compound crystal of a particulate with small crystallite, a polycrystalline particulate consisting of aggregated small single crystals, or a microcrystalline form wherein amorphous components exist around such particulates. Further, it is preferred that the half width of the diffraction peak near $2\theta=33.1°$ is $0.35°$ or more, and the half width of the diffraction peak near $2\theta=35.7°$ is $0.35°$ or more. Furthermore, it is more preferable that the half width of the diffraction peak near $2\theta=33.1°$ is $0.47°$ or more, and the half width of the diffraction peak near $2\theta=35.7°$ is $0.47°$ or more. Note that the position of a peak may have the possibility to be shifted by the distortion of the crystal or measurement errors, etc., and may be shifted about $\pm 0.1°$-$\pm 0.2°$.

Furthermore, in the X-ray diffraction of the said particulate mixture, a small diffraction peak is obtained in at least one of the following ranges: $2\theta=18\text{-}20°$, $26\text{-}28°$, $30\text{-}32°$, $38\text{-}40°$, and $42\text{-}44°$. These are the peaks that are derived from the silicon oxide, transition metal oxide, and lithium transition metal silicate. In other words, the particulate mixture of the present invention is a mixture of particulates comprising amorphous silicon oxide particulates, amorphous transition metal oxide, and particulates of microcrystalline or amorphous lithium transition metal silicate. Note that in the present invention, amorphous refers to a crystallite size of about 100 nm or less. The amorphous state is determined by applying the half width of the peak in an X-ray diffraction pattern to the Scherrer formula.

The lithium transition metal silicate particulate in the particulate mixture obtained, comprise a lithium transition metal silicate-type compound expressed as $Li_2MSiO_4$. M is at least one transition metal selected from the group consisting of Fe, Mn, Ti, Cr, V, Ni, Co, Cu, Zn, Al, Ge, Zr, Mo, and W. It is preferred to use two or more types of transition metals for reasons described later.

On the other hand, as for anions and polyanions of $SiO_4$ and $(SiO_4)_n$, part of $(SiO_4)_n$ may also be substituted by other anions. For example, substitution by transition metal acids (for example, titanic acid ($TiO_4$) and chromic acid ($CrO_4$), vanadic acid ($VO_4$, $V_2O_7$), zirconic acid ($ZrO_4$), molybdic acid ($MoO_4$, $Mo_7O_{24}$), tungstic acid ($WO_4$), etc.) of the elements exemplified as transition metal M, and substitution by phosphoric acid ($PO_4$) and boric acid ($BO_3$) may be performed.

(Production of the Active Material Aggregate)

By heat treatment of the particulate mixture, an active material aggregate is obtained. Further, by heat treatment, the amorphous particulate mixture combines into a mainly lithium transition metal silicate-type crystal form. Subsequently, in order to improve the conductivity of the product after heat treatment, organic compounds that are sources of conductive carbon, such as polyvinyl alcohol, sucrose, and carbon black, are added to the active material aggregate obtained by heat treatment, and further subjected to heat treatment. Note that it is also possible to add a conductive carbon source during the first heat treatment of the particulate mixture, and performing the coating and supporting process by carbon in the same calcination process as the crystallization process. Calcination conditions may be a combination of a temperature of 300-900° C., and a processing time of 0.5 to 10 hours, depending on the desired crystallinity and particle diameter. Excessive heat load from heat treatment at high temperature and long hours may produce a large rough single crystal, and should be avoided; thus, heat treatment condition that enables controlling the crystallite's size as small as possible, while providing lithium transition metal silicate compounds of desired crystallinity or micro-crystallinity, is desirable.

Figure 2:
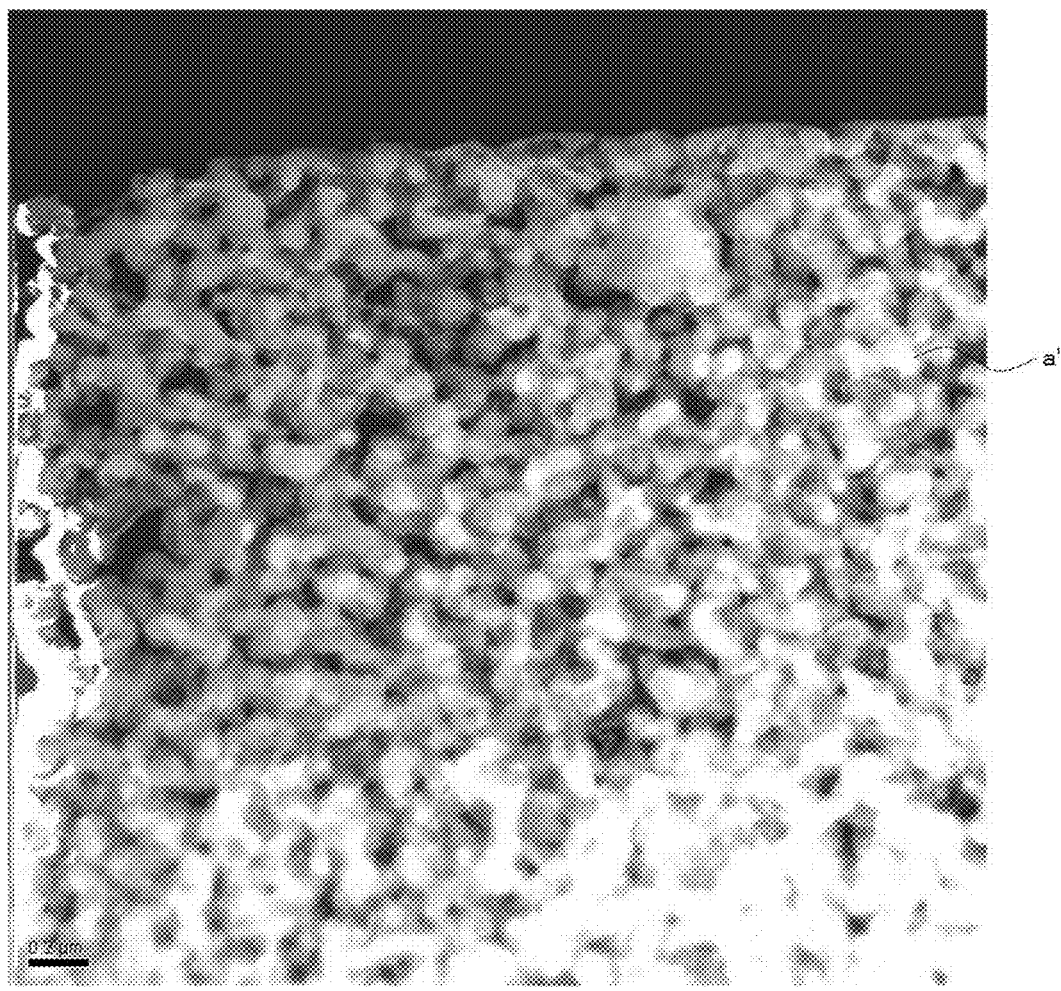
FIG. 2: a SEM photograph of active material aggregate a', according to the present invention.
Figure 3:
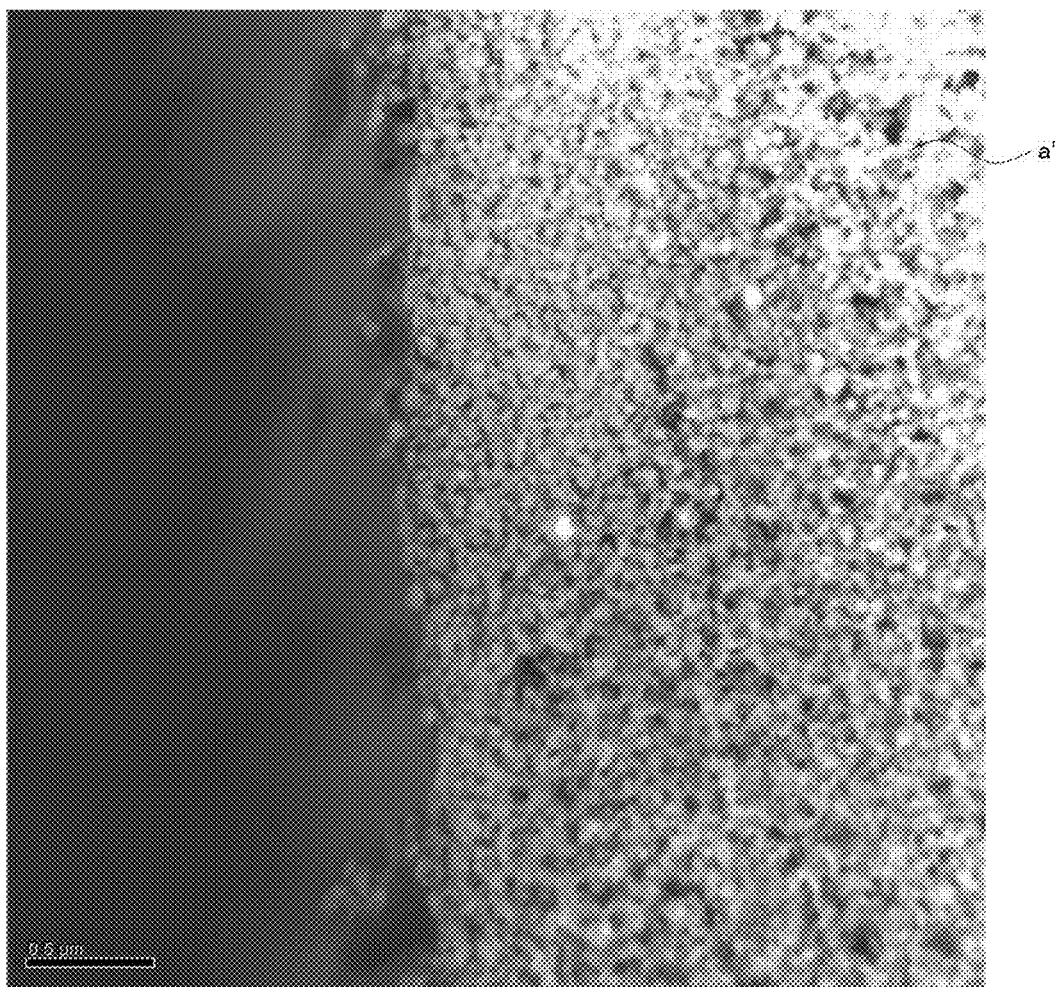
FIG. 3: another SEM photograph of active material aggregate a', according to the present invention.

Thus, for example, the porous active material aggregate of the present invention, as shown in FIG. 2 and FIG. 3, is obtained. The porosity and rate of void in the porous active material aggregate vary according to the material, especially the type of transition metal element and its rate of content. For example, a comparatively large void size and rate of void is seen for iron-type elements, with a three-dimensional void and a shape and space resulting from the produced aggregate, while for manganese-type elements, comparatively a large number of voids exists small values of rate of content having the uneven distribution. The sizes of the pores that can be observed from the surface of the active material aggregate of the present invention by an electron microscope are usually about 0.01-0.6 μm.

(Production of the Cathode Active Material)

Figure 4:
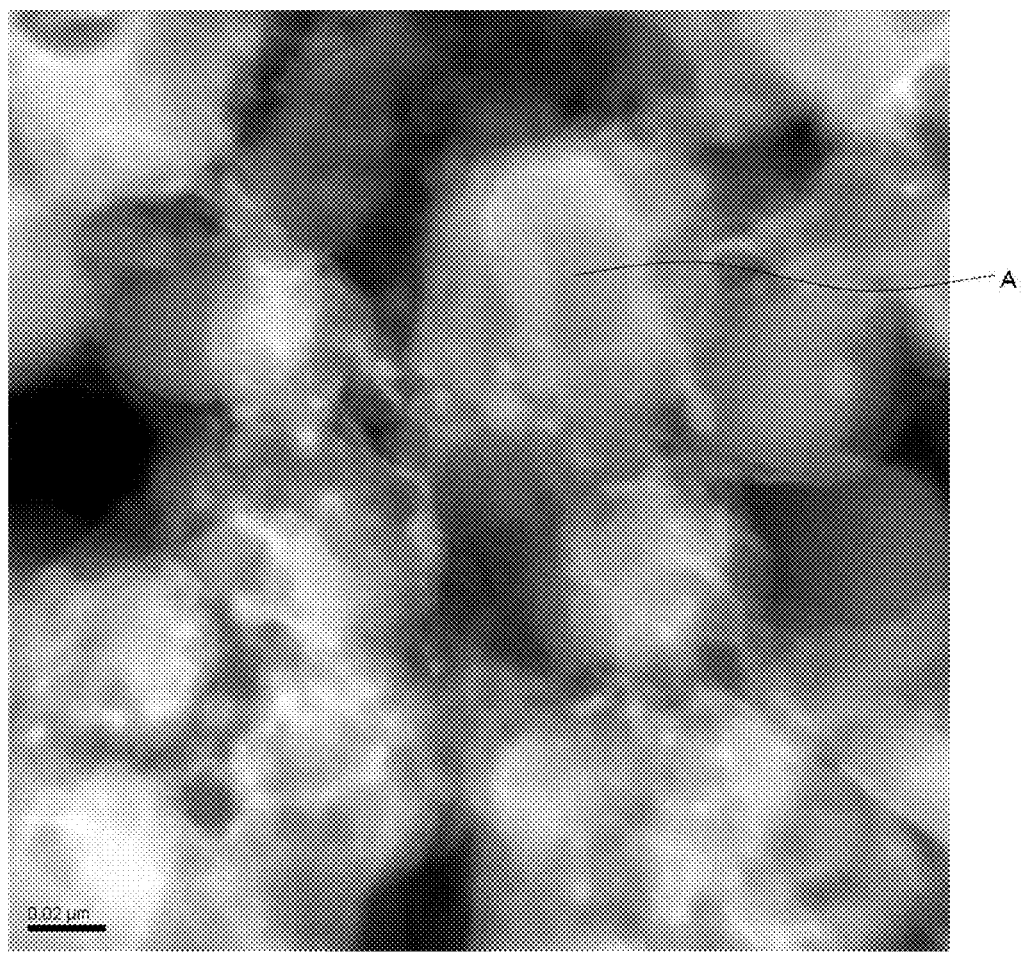
FIG. 4: a TEM photograph of cathode active material A, according to the present invention.
Figure 5:
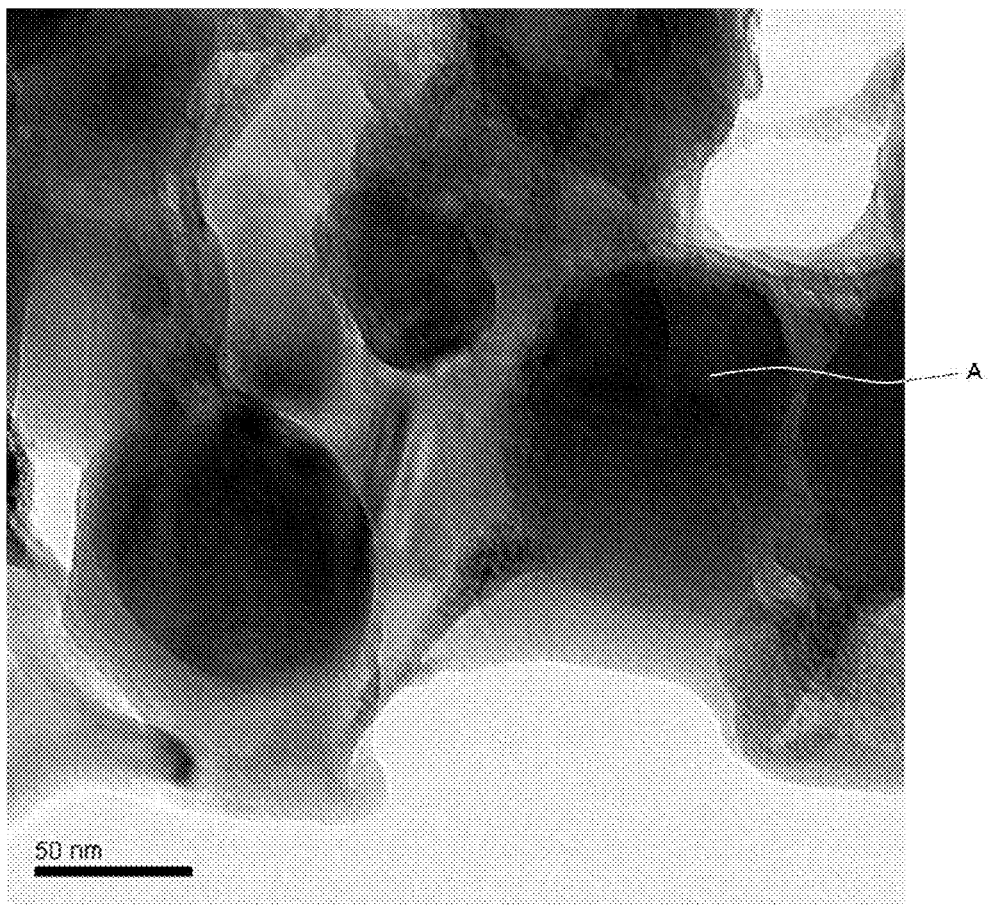
FIG. 5: another TEM photograph of cathode active material A, according to the present invention.

The acquired active material aggregate is then subjected to a grinding procedure, such as mortar or ball mill, to once again make into particulates, to create the cathode active material of the present invention, which can be used as an intercalation host of Li ion, as shown in FIG. 4 and FIG. 5.

Measuring the cathode active material by powder method X-ray diffraction in the range of $2\theta=10\text{-}50°$ obtains a diffraction peak in at least near $2\theta=33.1°$ and near $2\theta=35.7°$. This is considered to be a diffraction originating from the crystalline lithium transition metal silicate compound. However, although most of the crystallized lithium transition metal silicate-type compounds in the cathode active material of the present invention are fine crystals, "microcrystalline" states containing amorphous components also exists in a part. For example, a state in which particulates constituted of a plurality of crystallites are gathered together and covered with amorphous contents, a state in which fine crystals exist in a matrix of amorphous content, or a state in which amorphous components exist in the periphery of and between the particulates, are implied. These correspond to the state observed by the TEM images shown in FIG. 4 and FIG. 5.

Furthermore, measuring the cathode active material by powder method X-ray diffraction in the range of $2\theta=10\text{-}50°$ obtains a diffraction peak in at least one of the ranges of: $2\theta=18\text{-}20°$, $26\text{-}28°$, $30\text{-}32°$, $38\text{-}40°$, and $42\text{-}44°$. These are peaks originating from amorphous or crystalline silicon oxide, amorphous or crystalline transition metal oxide, or microcrystalline, crystalline or amorphous lithium transition metal silicate.

The cathode active material is mainly produced as a nano-scale particulate, and according to integration analysis by observation through transmission electron microscope image (TEM image) and particle size distribution measurement, it is a nano-size particulate with a particle size in the range of 5-150 nm, and an average particle size in the range of 10-70 nm. Furthermore, it is more preferred for the particle size to exist in the range of 5-120 nm, and for the average particle diameter to exist in the range of 20-50 nm. Here, particulates refer to polycrystals comprising a plurality of crystallites, and crystallites refer to the largest assembly that can be considered a single crystal. Note that the particle size distribution existing in the range of 5-150 nm does not necessarily mean that the particle size distribution obtained extend throughout the entire range of 5-150 nm, but rather means that the minimum of the particle size distribution is 5 nm or more and the maximum is 150 nm or less. That is, the acquired particle size distribution may be 5-45 nm, or may be 20-120 nm.

The characteristics of the obtained cathode active material, such as the capacity of charge and discharge, changes according to the transition metal used and its type. For example, if Fe materials are used as a transition metal source, the capacity remains in conventional levels if only one type of Fe is used, although it is low in cost and easy to synthesize. In Mn materials, it is also low in cost and easy to synthesize, but lithium manganese silicate has a fault in that the crystalline structure tends to deteriorate by intercalation and deintercalation of Li, and that the charge-and-discharge cycle life tends to be short. Thus, by using two elements of transition metals as in lithium iron manganese silicate ($Li_2Fe_{1-x}Mn_xSiO_4$), which uses two materials of Fe and Mn, the aforementioned problems of low capacity and crystal structure deterioration can be solved. Since higher oxidation state is difficult to acquire for certain elements such as Fe, by using two elements, it becomes a two electron reaction with Li, and charge-and-discharge capacity doubles. On the other hand, Fe contributes to the stabilization of the crystal structure. The same can be said for elements other than Fe and Mn, such as Ti Cr, V, Ni, Co, Cu, Zn, Al, Ge, Zr, Mo, and W.

On the other hand, the same can be said for $(SiO_4)_n$ silicate, which is an anion or a polyanion, and other anions can substitute part of $(SiO_4)_n$, as well. For example, substitution by the aforementioned transition metal acids, and by titanic acid ($TiO_4$) and chromic acid ($CrO_4$), vanadic acid ($VO_4$, $V_2O_7$), zirconic acid ($ZrO_4$), molybdic acid ($MoO_4$, $Mo_7O_{24}$), tungstic acid ($WO_4$), etc., or by phosphoric acid ($PO_4$) and boric acid ($BO_3$). By substituting some of the polysilicate ions with these types of anions, it contributes to inhibiting and stabilizing the change in crystal structure by repeated desorption and restitution of Li ion and the lengthening of cycle life. Further, since these anions do not easily emit oxygen even in high temperature, they can be used safely, without causing ignition.

(Cathode for Non-Aqueous Electrolyte Secondary Battery)

In order to form a cathode electrode using the cathode active material obtained by grinding the active material aggregate resulting from heat-treating the particulate mixture, electric conduction materials such as carbon black is added as required to the powdered cathode active material, which is coated with or supported on carbon; further, mixtures of binding agents such as polytetrafluoroethylene, polyfluorovinylidene, and polyimide, dispersing agents such as butadiene rubber, or thickeners such as cellulose derivative like carboxymethyl cellulose, are added to an aqueous solvent or an organic solvent, to obtain a slurry; then, the slurry is applied on one side or both sides of a current collector such as aluminum alloy foil, which contains 95 wt % or more of aluminum, and calcined to harden by evaporating the solvent. Thus, the cathode of the present invention is obtained.

In this case, in order to increase the applicability of the slurry and the adhesiveness and current collectivity of the current collector and the active material, the cathode active material may be subjected to pelletizing and calcining by a spray-dry method with a carbon source etc., to obtain secondary particles, which can then be used in place of the active material in the slurry. Although the mass of secondary particles obtained by pelletizing become large clusters of about 0.5-20 μm, the slurry applicability improves dramatically and the property and life of the battery electrode also improves. The slurry used for the spray-dry method can be usable of an aqueous solvent or a non-aqueous solvent.

Furthermore, in the cathode obtained by applying the slurry containing the aforementioned active material onto a current collector such as aluminum alloy foil, the surface roughness of the current collector surface onto which the active material layer is to be formed should desirably be 0.5 μm or more for the ten-point average roughness Rz, specified by the Japanese Industrial Standards (JIS B0601-1994). The adhesiveness of the formed active material layer and the current collector increases and the electron conductivity accompanying insertion-desorption of Li ion and the macro current collectivity to the current collector increases, leading to improved charge and discharge cycle life.

Furthermore, if a composite state appears at the interface of the aforementioned current collector and the active material layer formed on the current collector, in which the main components of the current collector are diffused to at least the active material layer, the binding ability at the interface of the current collector and the active material layer improves, and tolerance against change in volume and crystal structure with charge-and-discharge cycle increases, thereby improving the cycle life. It is more preferable when the aforementioned surface roughness condition of the current collector is fulfilled.

(Non-Aqueous Electrolyte Secondary Battery)

In order to obtain a high capacity secondary battery that uses the cathode of the present invention, various materials, such as anodes of known anode active materials, electrolyte solutions, separators, cell casings, etc. can be used without particular restriction.

Although capacity is high and good electrode properties can be obtained for the secondary battery that uses the cathode of the present invention, by adding or using a non-aqueous solvent containing fluoride in the non-aqueous electrolyte solution that constitutes the secondary battery, the decrease in capacity by repeated charge-and-discharge can be inhibited, and its service life can be prolonged. For example, in using an anode that comprises a high capacity silicon-type anode active material, in order to inhibit the large expansion-contraction by doping and undoping of Li ion, it is especially desirable to use an electrolyte solution that contains fluorine, or an electrolyte solution that contains a non-aqueous solvent that has fluorine as a substituent. Since a fluorine-containing solvent reduces the volume expansion of the silicon-type film that is formed by alloying with Li ion during charging, especially at the first charge, it can inhibit the decline in capacity due to charge and discharge. Fluorinated ethylene carbonate and fluorinated linear carbonate, etc. can be used as the fluorine-containing non-aqueous solvent. An example of fluorinated ethylene carbonate is mono-tetra-fluoroethylene carbonate (4-fluoro-1,3-dioxolan-2-one, FEC) and examples of fluorinated linear carbonates are methyl-2,2,2-trifluoroethyl carbonate, ethyl-2,2,2-trifluoroethyl carbonate, etc.; these may be added to the electrolyte solution singly or in combination. Since fluorine substituents easily bond with silicon and are tough, it is thought that it stabilizes the film at charge alloying with Li ion, and contributes in inhibiting expansion.

(Effect of the Present Invention)

According to the present invention, a particulate mixture of amorphous or low-crystalline lithium transition metal silicate, with nano-scale particle size that was not conventionally available, can be obtained. Since the particulate mixture can be crystallized in the subsequent heat treatment process, lithium transition metal silicate with a desired crystallinity can be obtained by changing heat treatment conditions such as temperature and duration of heat treatment process.

Since the cathode active material for secondary battery of the present invention has a small crystal or primary particle of nano-scale that was not conventionally available, and since its crystallinity is low, the distance of travel for Li ions and electrons are small; thus, ion conductivity and electron conductivity are excellent, enabling high capacity, which the silicate-type lithium transition metal compounds essentially have, to be obtained at charge and discharge.

As hitherto described, the secondary battery that uses a cathode that uses the cathode active material containing crystallized lithium transition metal silicate-type compound, which is obtained by calcining the particulate mixture of the present invention, uses lithium transition metal silicate-type compounds that essentially has a high specific capacity, and fulfills charge-and-discharge at room temperature, which was not accomplished conventionally, and provides good electrode properties. Thus, the non-aqueous electrolyte secondary battery that uses the cathode active material of the present invention can realize a secondary battery that uses lithium transition metal silicate-type compounds, for which large capacity is expected, in the future. Such high-capacity secondary battery can be used as power source supplies for mobile electronic equipments, power tools, and electric vehicles.

EXAMPLES

Hereinafter, the present invention will be described with reference to Examples; however, the present invention is not limited in any way by these Examples.

Note that although in the following Examples lithium iron manganese silicate compound was synthesized, the same synthesis procedures can be applied and provided when using other transition metals or when adding other anions to the composing material.

(1) Synthesis of the Particulate Mixture

First, the particulate mixture for producing the lithium transition metal silicate-type cathode active material for evaluation was prepared as follows.

(1-1) Synthesis Example 1

The production apparatus for producing the particulate mixture by the flame method is shown in FIG. 1. The reaction vessel in the apparatus of FIG. 1 comprises: a wick stick 2 for generation and deposition of the particulate mixture 1 in the center; a plurality of burners 3-6 for supplying oxygen and hydrogen gas, which are flame materials, as well as the raw material gas, to the surface of the wick stick 2; and an exhaust pipe for emitting reaction products such as generated particulates and hydrochloric acid that were not disposed, on the other side. The types and supply flow rate conditions of the raw materials that were supplied from the burner were as follows. (Target Composition: $Li_2Mn_{1-x}Fe_xSiO_4$, X=0.9)

$H_2$: 5 $dm^3$/min,
$O_2$: 5 $dm^3$/min,
LiCl (4 M solution): 0.2 $dm^3$/min,
$FeCl_2.4H_2O$ (1 M solution): 0.09 $dm^3$/min,
$MnCl_2.4H_2O$ (1M solution): 0.01 $dm^3$/min,
$SiCl_4$: 0.1 $dm^3$/min, A specific amount of $N_2$ gas was separately supplied to maintain an inert atmosphere inside the reaction vessel. Under such conditions, particulate mixtures of silica particulates, transition metal oxide particulates such as iron oxide and manganese oxide, and particulates of lithium iron manganese silicate compound, which were precursors of the cathode active material, synthesized in the flame from the burner, accumulated on the wick stick. The particulates were deposited uniformly with equal thickness by pulling up the wick stick while rotating. The particulate mixture deposited on the wick stick was collected by flaking. As a precaution, the particulate mixture was filtrated to remove any impurities and to obtain a uniform particulate size. The obtained particulate mixture was labeled Particulate Mixture a.

(1-2) Synthesis Example 2

Similarly, Particulate Mixture b was synthesized and collected by the flame method, supplying raw material fluid of the following predetermined concentrations into a propane combustion flame of air and propane gas, and heat oxidizing. (Composition Target: $Li_2Mn_{1-x}Fe_xSiO_4$, X=0.1)

Lithium naphthenate (4 M solution): 0.2 $dm^3$/min
$C_{16}H_{30}FeO_4$ (2-ethylhexanoic acid iron(II) salt) (1 M solution): 0.01 $dm^3$/min
$C_{16}H_{30}MnO_4$ (2-ethylhexanoic acid Mn(II) salt) (1 M solution): 0.09 $dm^3$/min
$C_8H_{24}O_4Si_4$ (octamethylcyclotetrasiloxane) (1 M solution): 0.1 $dm^3$/min (1-3) Synthesis Comparative Example 1

Subsequently, the active material of Synthesis Comparative Example 1 was prepared. The following raw materials were fed into a pressure-resistant container with an inner cylinder made of polytetrafluoroethylene, and hydrothermal synthesis was performed under 170° C. for 18 hours in an autoclave. (Composition Target: $Li_2Mn_{1-x}Fe_xSiO_4$, X=0.5)

LiOH—$H_2O$: 0.2 mol,
$FeCl_2.4H_2O$: 0.05 mol,
$MnCl_2.4H_2O$: 0.05 mol,
$SiO_2$ fine powder: 0.1 mol, A small amount (about 0.01 mol) of L-ascorbic acid dissolved in ion exchange water was added separately to obtain a total of 0.5 $dm^3$.

After cooling to room temperature, the precipitated reaction products were collected, washed with pure water, and dried under vacuum at 70° C. for 2 hours, to obtain Active Material r.

(1-4) Synthesis Comparative Example 2

Furthermore, Active Material s was produced as Synthesis Comparative Example 2. Synthesis by a solid phase method was performed by mixing the following raw materials, injecting, and calcining in an electric furnace. (Composition Target: $Li_2Mn_{1-x}Fe_xSiO_4$, X=0.9)

$Li_2CO_3$: 0.2 mol,
$FeC_2O_4.2H_2O$: 0.09 mol,
$MnC_2O_4.2H_2O$: 0.01 mol,
$SiO_2$ fine powder: 0.1 mol, After repeating temporary calcination at 700° C. for 12 hours and actual calcination at 1000° C. for 24 hours twice, Active Material s of solid-phase synthesis was obtained.

(2) Synthesis of Active Material Aggregate and Active Material (2-1) Examples 1, 3, 4, and Comparative Example 4

Next, a specific amount of Particulate Mixture a and polyvinyl alcohol were added to a $N_2$-filled airtight vessel, subjected to various conditions of heat treatment at temperatures and times indicated in Table 2, subjected to carbon coating or supported on carbon, to obtain Active Material Aggregates a', a1', a2', and q'. These active material aggregates were subjected to grinding, and Cathode Active Materials A, A1, A2 and Q of lithium iron manganese silicate-type compounds by flame method were obtained as Examples or Comparative Examples.

(2-2) Example 2

Further, Particulate Mixture b was subjected to heat treatment and carbon coating under the same conditions as those of Example 1 to obtain an active material aggregate, and grinding was performed to obtain Cathode Active Material B.

(2-3) Comparative Examples 1 and 2

Further, as in Example 1, after mixing polyvinyl alcohol to Active Material r and heat treating at 650° C. for 4 hours, carbon coating or carbon supporting was performed, to obtain Cathode Active Materials P and R.

(2-4) Comparative Example 3

Furthermore, as in Example 1, after mixing polyvinyl alcohol to Active Material s and heat treating at 650° C. for 4 hours, carbon coating or carbon supporting was performed, to obtain Cathode Active Material S.

(3) Measurement and Observation of Samples (3-1) Powder X-ray Diffraction Measurement Powder X-ray diffraction measurement)($2\theta$=10-50°) of the particulate mixture and the cathode active material of the Example of the present invention and the Comparative Example were performed under the following measurement conditions, and the crystallinity, diffractive performance and angle of diffraction $2\theta$ of the synthesized particulate, as well as the crystallinity and crystal size of the cathode active material, were studied.

X-ray: CuKα ray; output: 1.2 kW; measuring device: RINT2000 (Rigaku Corporation)

(3-2) Scanning Electron Microscope (SEM) Observation

The acquired active material aggregate was observed by SEM. The size of the void of the active material aggregate after heat treatment of the particulate mixture was studied by SEM image observation.

(3-3) Transmission Electron Microscope (TEM) Observation

Similarly, TEM observation and image analysis of the TEM image were conducted for the obtained cathode active material, and the particle distribution, average particle diameter, and particle shape were studied.

(4) Production of Cathode for Evaluation Using the Active Material Sample and Secondary Battery A conductive auxiliary agent (carbon black) was mixed with the Cathode Active Material powder A, B, A1, A2, P, Q, R, and S, obtained in the Examples and Comparative Examples, so that its concentration was 10 wt % against said powder, and mixed in a ball mill, of which its interior was substituted by nitrogen, for 5 hours. The mixed powder and a binder of polyvinylidene fluoride (PVdF) were mixed at a weight ratio of 95:5, and well kneaded after adding N-methyl-2-pyrolidone (NMP), to obtain a cathode slurry.

The cathode slurry was applied to an aluminum foil current collector of 15 μm thickness in an amount of 50 g/m$^2$, and dried for 30 minutes at 120° C. Then, it was subjected to a roll process under a roll press so that the density became 2.0 g/cm$^3$, and was pierced in the shape of a disk of 2 cm$^2$ to form a cathode.

These cathodes were used, along with metallic lithium as the anode, and LiPF$_6$ dissolved in ethylene carbonate and diethyl carbonate of mixed solvent mixed in the same volume ratio in a concentration of 1 M as the electrolyte, to produce a lithium secondary battery. Further, in Example 5, a similar battery prepared using mono-tetra-fluoroethylene carbonate instead of ethylene carbonate in the electrolyte solution, was used. Note that the production atmosphere was at a dew point of −50° C. or less. Each electrode was embedded onto a container with a current collector attached thereto. A coin-shaped lithium secondary battery of 25 mm diameter and 1.6 mm thickness was prepared using the above-mentioned cathode, anode, electrolyte and separator.

(5) Evaluation of Samples

Next, the cathode active material of the present invention was evaluated by the following method, using the aforementioned coin-type lithium secondary battery.

The battery was charged to 4.5 V (against Li/Li$^+$) by the CC-CV method at a current rate of 0.01 C, then discharged to 1.5V (same as above) by the CC method at a rate of 0.01 C, and early charge-and-discharge capacity was measured. Examples 1-5 and Comparative Examples 3 and 4 were examined at a test temperature of 25° C., and Comparative Examples 1 and 2 were examined at a test temperature of 60° C.

The synthesis conditions and results for the particulate mixtures and the active materials are shown in Table 1, and the specifications and test results for the experiment cathode active materials are shown in Table 2 and Table 3.

TABLE 1

| | | Synthesis Condition for Particulate Mixture | | | Measurement Results of Particulate Mixture and Active Material | | | | | | | Crystallinity (Diffraction Height) | 33.1° Half Width | 35.7° Half Width |
|---|---|---|---|---|---|---|---|---|---|---|---|---|---|---|
| | Particulate | Syntesis | Heat | | Existence of XRD2θ (=5-50°) Diffraction Peak | | | | | | | | | |
| No | Label | Method | Source | Material | 33.1 | 35.7 | 18-20 | 26-28 | 30-32 | 38-40 | 42-44 | | | |
| Synthesis Example 1 | a | Flame Method | Oxyhydrogen flame | Gas/Chloride | Yes | Yes | Yes | Yes | No | Yes | Yes | Low | 0.70 | 0.47 |
| Synthesis Example 2 | b | Flame Method | Burning flame | Liquid | Yes | Yes | Yes | Yes | Yes | No | Yes | Low | 0.47 | 0.90 |
| Synthesis Comparative Example 1 | r | Hydro-thermal Method | — | Solid or Liquid | Yes | Yes | No | Yes | Yes | Yes | Yes | High | 0.19 | 0.17 |
| Synthesis Comparative Example 2 | s | Solid Phase Method | — | Solid | Yes | Yes | No | Yes | Yes | Yes | Yes | High | 0.17 | 0.15 |

TABLE 2

| | | Synthesis Condition for Active Material | | | Heat Treatment Condition | | Measurement Results of Particulate Mixture and Active Material | | | | | | |
|---|---|---|---|---|---|---|---|---|---|---|---|---|---|
| | Cathode Active Material | Synthesis | Heat | | Temperature | Time | Existence of XRD2θ(=5-50°) Diffraction Peak | | | | | | |
| No | Label | Method | Source | Material | (° C.) | (hr) | 33.1 | 35.7 | 18-20 | 26-28 | 30-32 | 38-40 | 42-44 |
| Example 1 | A | Flame Method | oxyhydrogen flame | Gas/Chloride | 650 | 4 | yes | yes | no | no | yes | yes | yes |
| Example 2 | B | Flame Method | burning flame | Liquid | 650 | 4 | yes | yes | yes | no | no | yes | yes |
| Example 3 | A1 | Flame Method | oxyhydrogen flame | Gas/Chloride | 300 | 10 | yes | yes | yes | yes | yes | yes | yes |

TABLE 2-continued

| No | | Synthesis Method | Heat Source | Material | Temp (°C) | Time (hr) | | | | | | | |
|---|---|---|---|---|---|---|---|---|---|---|---|---|---|
| Example 4 | A2 | Flame Method | oxyhydrogen flame | Gas/Chloride | 900 | 0.5 | yes | yes | yes | yes | no | yes | yes |
| Comparative Example 1 | P | Hydrothermal Method | — | Solid or Liquid | 650 | 4 | yes | yes | no | no | no | no | no |
| Comparative Example 2 | R | Hydrothermal Method | — | Solid or Liquid | 650 | 4 | yes | yes | no | no | no | no | no |
| Comparative Example 3 | S | Solid Phase Method | — | Solid | 650 | 4 | yes | yes | no | no | yes | yes | yes |
| Comparative Example 4 | Q | Flame Method | oxyhydrogen flame | Gas/Chloride | 900 | 12 | yes | yes | no | no | no | no | no |

| | Measurement Results of Particulate Mixture and Active Material | | | | | Active Material |
|---|---|---|---|---|---|---|
| | Crystallinity | | | TEM image/EDS analysis | | Aggregate |
| | (Diffraction | Particle (nm) | | Particle | | Void Size |
| No | Height) | Distribution | Average | Shape | Crystallinity | (mm) |
| Example 1 | low | 20-120 | 48 | roughly spherical | micro-crystanlline | 0.1-0.5 |
| Example 2 | low | 10-90 | 32 | roughly spherical | micro-crystanlline | 0.05-0.3 |
| Example 3 | low | 5-45 | 13 | roughly spherical to cyllindrical | micro-crystanlline | 0.05-0.25 |
| Example 4 | low | 10-70 | 17 | roughly spherical to cyllindrical | micro-crystanlline | 0.05-0.3 |
| Comparative Example 1 | high | — | — | roughly spherical | crystalline | — |
| Comparative Example 2 | high | — | — | random | crystalline | — |
| Comparative Example 3 | high | — | — | stick or cylindrical | crystalline | — |
| Comparative Example 4 | high | 80-180 | 130 | roughly spherical to cyllindrical | crystalline | 0.5-5 |

TABLE 3

| | Synthesis Condition for Active Material | | | | | | Cathode Current Collector | |
|---|---|---|---|---|---|---|---|---|
| | Cathode Active Material Label | Synthesis Method | Heat Source | Material | Heat Treatment Condition | | | Surface Roughness Rz (µm) |
| No | | | | | Temperature (°C.) | Time (hr) | Material | |
| Example 1 | A | Flame Method | oxyhydrogen flame | Gas/Chloride | 650 | 4 | Al alloy foil | 0.7 |
| Example 2 | B | Flame Method | burning flame | Liquid | 650 | 4 | Al alloy foil | 0.5 |
| Example 3 | A1 | Flame Method | oxyhydrogen flame | Gas/Chloride | 300 | 10 | Al alloy foil | 1 |
| Example 4 | A2 | Flame Method | oxyhydrogen flame | Gas/Chloride | 900 | 0.5 | Al alloy foil | 0.7 |
| Example 5 | A | Flame Method | oxyhydrogen flame | Gas/Chloride | 650 | 4 | Al alloy foil | 0.7 |
| Comparative Example 1 | P | Hydrothermal Method | — | Solid or Liquid | 650 | 4 | Al alloy foil | 0.7 |
| Comparative Example 2 | R | Hydrothermal Method | — | Solid or Liquid | 650 | 4 | Al alloy foil | 0.7 |
| Comparative Example 3 | S | Solid Phase Method | — | Solid | 650 | 4 | Al alloy foil | 0.7 |
| Comparative Example 4 | Q | Flame Method | oxyhydrogen flame | Gas/Chloride | 900 | 12 | Al alloy foil | 0.7 |

| | Cathode Active Material Film | Evaluation Result for Room Temperature Property of Secondary Battery | | |
|---|---|---|---|---|
| No | Interface/Current Collector Component Diffusion (EPMA) | First Charge Capacity (mAh/g) | First Discharge Capacity (mAg/g) | Non-aqueous Solvent of Electrolyte |
| Example 1 | Yes | 160 | 160 | Non-F-containing |
| Example 2 | Yes | 163 | 163 | Non-F-containing |
| Example 3 | Yes | 115 | 110 | Non-F-containing |
| Example 4 | Yes | 105 | 100 | Non-F-containing |

TABLE 3-continued

| | | | | |
|---|---|---|---|---|
| Example 5 | Yes | 165 | 165 | F-containing |
| Comparative Example 1 | Yes | 111 (60° C.) | 103 (60° C.) | Non-F-containing |
| Comparative Example 2 | Yes | 70 (60° C.) | 45 (60° C.) | Non-F-containing |
| Comparative Example 3 | No | Not chargable | — | Non-F-containing |
| Comparative Example 4 | Yes | 55 | 40 | Non-F-containing |

Figure 6:
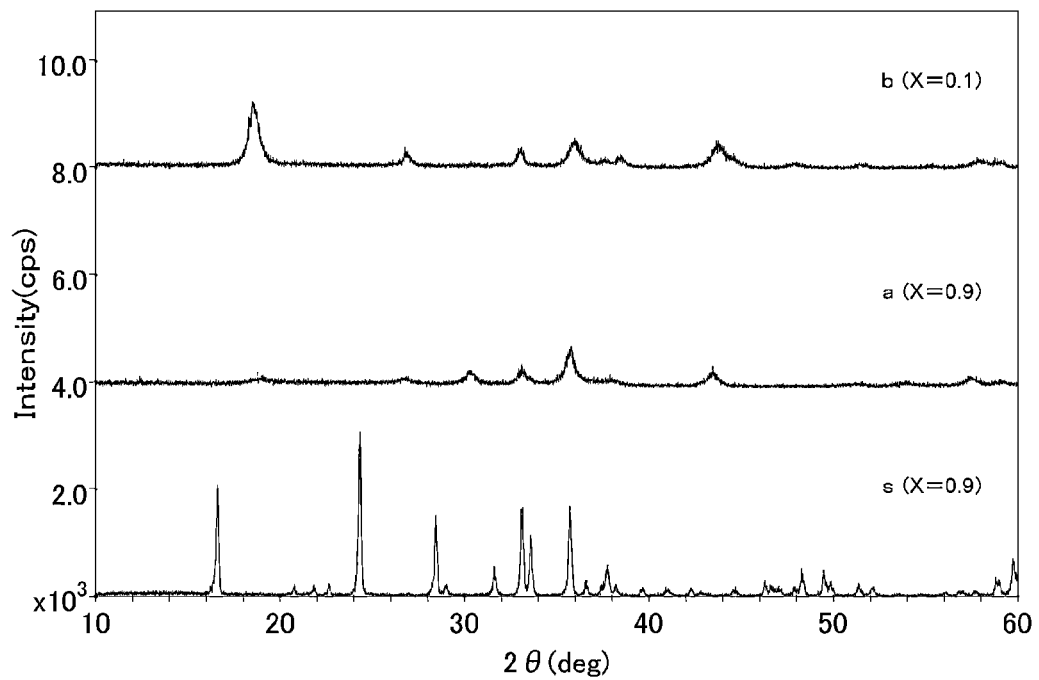
FIG. 6: the XRD patterns of particulate mixtures a and b, according to the present invention, and active material s, according to the comparative example.
Figure 7:
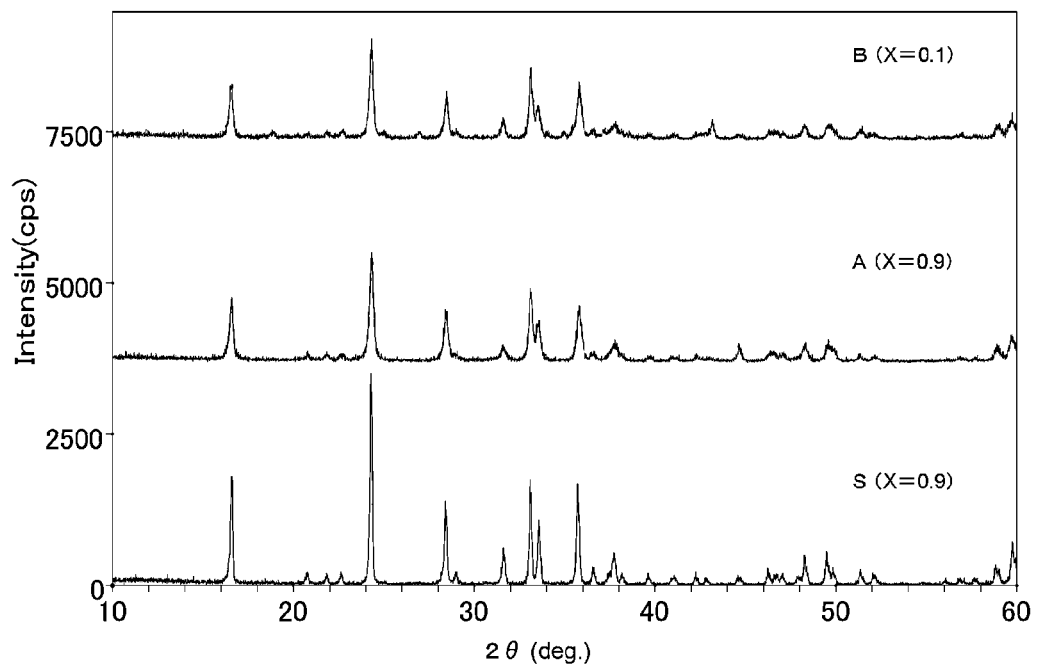
FIG. 7: the XRD patterns of cathode active materials A and B, according to the present invention, and cathode active material S according to the comparative example.

Furthermore, the SEM images of Active Material Aggregate a' are shown in FIG. 2 and FIG. 3. Moreover, the TEM images of Cathode Active Material A are shown in FIG. 4 and FIG. 5. Further, the XRD measurement results for Particulate Mixtures b and a, and Active Material s are shown in FIG. 6. Also, the XRD measurement results for Cathode Active Materials B, A, and S are shown in FIG. 7.

From the above-described sample preparation specifications, test measurements, and evaluation results, the following may be said: In Examples 1-4, in which particulate mixtures were produced by the flame method, a large capacity, which could not be obtained by conventional lithium transition metal silicate-type materials, was obtained in the first charge-and-discharge test, for the first time, in room temperature.

Next, in the active materials of Comparative Examples 1-2 by hydrothermal synthesis, the crystallinity was very high for Cathode Active Material P of Comparative Example 1, while the crystallinity of Cathode Active Material R of Comparative Example 2 was very high with particles aggregated to form a cluster, differing from the results of Examples 1-4. For this reason, charging could not be accomplished at a test temperature of 25° C., and although charge-and-discharge capacity was obtained at a test temperature of 60° C., it remained small.

Furthermore, for the synthesized material by the solid phase method of Comparative Example 3, the high temperature and long hours of the calcination condition led to a large crystal growth, and charging could not be accomplished at room temperature.

As for the comparison of carbon coat annealing conditions in Examples 1-4 and Comparative Example 4 by the flame method, an active material of normal quality is obtained as long as it is within the realm of regular temperature and time, but in the strong annealing condition of Comparative Example 4, even if a particulate mixture of amorphous, crystalline, or microcrystalline properties are obtained, crystals grow large, leading to an electrode and battery of insufficient charge-and-discharge capacity.

In Example 5, wherein a non-aqueous solvent containing fluoride is used in the electrolyte solution, a large capacity was shown compared to Example 1, for which other conditions are the same. As for the effect of fluorine-containing solvents, surface roughness of current collector on the cathode, and the state of the composite interface formed by the diffusion of current collector components in the interface of the active material layer-forming side, the repetition cycle of charge-and-discharge must be performed for a certain length of time, but as far as can be said presently, no problems were observed in the results.

According to FIG. 2 and FIG. 3, Active Material Aggregate a' is observed as an aggregate of a plurality of particles with diameters of about 50-200 nm, with voids. Further, the void between each particle can be seen as being about 0.1-0.5 μm.

According to FIG. 4 and FIG. 5, Cathode Active Material A is observed as an aggregate of a plurality of particles with diameters of about 50-100 nm. In particular, in FIG. 5, amorphous carbon coating the periphery of the lithium transition metal silicates, observed black, can be seen.

According to the result of powder X-ray diffraction analysis shown in FIG. 6, Particulate Mixtures b and a, and Active Material s, have diffraction peaks at 2θ=33.1° and 35.7°. The half width of these peaks are larger for Particulate Mixtures b and a, than for Active Material s. It can be seen that the peaks for Active Material s are sharper in all, indicating that Active Material s has a high crystallinity. On the other hand, the half widths of the peaks for Particulate Mixtures b and a are large, indicating that Particulate Mixtures b and a consist of amorphous or fine crystal components.

The X-ray diffraction peaks of Cathode Active Materials A and B by the flame method, shown in FIG. 7, have tendencies of wider diffraction width, such as wide half width, indicating that the crystallites are small and that each particle are aggregated crystallites. On the other hand, the diffraction peaks of Cathode Active Material S by solid phase synthesis were sharper with larger diffraction intensities, indicating a typical aggregate of large crystallites or a single crystal, and the difference between Cathode Active Materials A and B are apparent.

Furthermore, cathode active materials for which the type of transition metal used were changed, and cathode active materials for which parts of the silicate were substituted by other anions were synthesized by methods similar to that of Synthesis Example 1 and Example 1, as Examples 6-17. The composition of the transition metal and anion in the cathode active materials were determined by ICP-AES measurement of the particulate mixture immediately after synthesis by the flame method. Further, the cathode electrode for test evaluation and secondary battery that uses the cathode active material obtained, were produced by method similar to that of Example 1. Further, the initial discharge capacity was measured by the same methods as Example 1, that is, at a testing temperature of 25° C. and a current rate of 0.01 C by the CC-CV method. Measurement results and test results for Examples 6-17 are shown in Table 4.

TABLE 4

| | Cathode Active Material Composition | | First Discharge Capacity |
|---|---|---|---|
| | Transition Metal | Anion | (mAh/g) |
| Example 6 | $Fe_{0.5}Ti_{0.5}$ | $SiO_4$ | 148 |
| Example 7 | $Fe_{0.5}Cr_{0.5}$ | $SiO_4$ | 143 |
| Example 8 | $Fe_{0.5}V_{0.5}$ | $SiO_4$ | 157 |
| Example 9 | $Fe_{0.5}Ni_{0.5}$ | $SiO_4$ | 170 |
| Example 10 | $Fe_{0.5}Co_{0.5}$ | $SiO_4$ | 155 |
| Example 11 | $Fe_{0.5}Zn_{0.5}$ | $SiO_4$ | 126 |
| Example 12 | $Fe_{0.5}Al_{0.5}$ | $SiO_4$ | 120 |
| Example 13 | $Fe_{0.5}Ge_{0.5}$ | $SiO_4$ | 118 |

TABLE 4-continued

| | Cathode Active Material Composition | | First Discharge Capacity |
|---|---|---|---|
| | Transition Metal | Anion | (mAh/g) |
| Example 14 | $Fe_{0.5}Zr_{0.5}$ | $SiO_4$ | 143 |
| Example 15 | $Fe_{0.5}Mo_{0.5}$ | $SiO_4$ | 165 |
| Example 16 | $Fe_{0.5}Mn_{0.5}$ | $(SiO_4)_{0.9}(PO_4)_{0.1}$ | 161 |
| Example 17 | $Fe_{0.5}Mn_{0.5}$ | $(SiO_4)_{0.9}(BO_3)_{0.1}$ | 144 |

As indicated in Examples 6-15, the cathode active material of the present invention has a high initial discharge capacity at normal temperature, not only when iron and manganese are used as the transition metals, as in Examples 1-5, but even when metallic elements such as various transition metals are used. Further, as can be seen from Examples 16 and 17, in the present invention, parts of the silicate constituting the lithium transition metal silicate may be substituted by anions other than silicate, such as phosphates and borates.

As described above, the particulate mixture of the present invention is a material that can serve as an outstanding active material precursor, and by subjecting to certain heat treatments etc. afterwards, lithium transition metal silicate-type compounds of unprecedented small particle size and low crystallinity can be produced. The cathode obtained by applying the cathode active material prepared using the particulate mixture of the present invention to a given current collector, can be used as a cathode that shows excellent charge and discharge properties, in chargeable and dischargeable secondary batteries such as lithium ion secondary battery that uses non-aqueous electrolytes. By further improvement, this can become the foundation for enhancing the charge-and-discharge properties even more, with a higher theoretical specific capacity, which is inherent to this type of compound, in view. Thus, properties of higher energy or higher output, not available conventionally, can be added to applications in conventional electronic equipments, as well as in industrial and automotive applications, which have started to be put into practical use. Moreover, the flame method, which is the method used for producing the particulate mixture of the present invention, is excellent in mass productivity, and is able to provide products at low cost.

| | Description of Notations |
|---|---|
| 1 | Particulate mixture deposition |
| 2 | Wick stick made of silica |
| 3 | 1st burner |
| 4 | 2nd burner |
| 5 | 3rd burner |
| 6 | 4th burner |
| a' | Active material aggregate |
| A, B, S | Cathode active material |

The invention claimed is:

1. A particulate mixture, which comprises silicon oxide particulates, transition metal oxide particulates, and lithium transition metal silicate particulates;
wherein the powder X-ray diffraction measurement of the particulate mixture shows diffraction peaks near $2\theta=33.1°$ and near $2\theta=35.7°$;
said silicon oxide particulates and said transition metal oxide particulates are amorphous; and
said lithium transition metal silicate particulates are in a microcrystalline or amorphous state.

2. The particulate mixture according to claim 1, wherein the full width at half maximum of the diffraction peak near $2\theta=33.1°$ is 0.35° or more, and wherein the full width at half maximum of the diffraction peak near $2\theta=35.7°$ is 0.35° or more.

3. The particulate mixture according to claim 1, wherein said transition metal oxide particulates and said lithium transition metal silicate particulates contain at least two elements selected from Fe, Mn, Ti, Cr, V, Ni, Co, Cu, Zn, Al, Ge, Zr, Mo, or W.

4. A particulate mixture which comprises silicon oxide particulates, transition metal oxide particulates, and lithium transition metal silicate particulates wherein the powder X-ray diffraction measurement of the particulate mixture shows diffraction peaks near $2\theta=33.1°$ and near $2\theta=35.7°$; said silicon oxide particulates and said transition metal oxide particulates are amorphous; said lithium transition metal silicate particulates are in a microcrystalline or amorphous state; and wherein part of the silicate in said lithium transition metal silicate particulates is replaced by metallate, phosphate or borate which does not emit oxygen.

* * * * *